United States Patent
Mak et al.

(10) Patent No.: US 7,924,225 B2
(45) Date of Patent: Apr. 12, 2011

(54) DIRECTION FINDING ANTENNA SYSTEMS AND METHODS FOR USE THEREOF

(75) Inventors: Angus C. K. Mak, Shaton (HK);
Corbett R. Rowell, Mongkok (CN);
Chi-Lun Mak, Shaton (HK)

(73) Assignee: Hong Kong Applied Science and Technology Research Institute Co., Ltd., Hong Kong (CN)

( * ) Notice: Subject to any disclaimer, the term of this patent is extended or adjusted under 35 U.S.C. 154(b) by 381 days.

(21) Appl. No.: 12/144,465

(22) Filed: Jun. 23, 2008

(65) Prior Publication Data

US 2009/0315759 A1 Dec. 24, 2009

(51) Int. Cl.
*G01S 5/04* (2006.01)
*H01Q 21/00* (2006.01)

(52) U.S. Cl. ........ 342/433; 342/432; 342/439; 343/835; 343/836

(58) Field of Classification Search .......... 343/834–836; 342/147, 419, 432–433, 439–440
See application file for complete search history.

(56) References Cited

U.S. PATENT DOCUMENTS

| | | | |
|---|---|---|---|
| 2,831,187 A * | 4/1958 | Harris et al. | 342/433 |
| 5,661,489 A | 8/1997 | Baker | |
| 6,411,824 B1 * | 6/2002 | Eidson | 342/361 |
| 2003/0016176 A1 | 1/2003 | Kingsley et al. | |
| 2003/0184478 A1 | 10/2003 | Kingsley et al. | |
| 2005/0174298 A1 * | 8/2005 | Chiang et al. | 343/834 |
| 2006/0125704 A1 | 6/2006 | Melconian et al. | |
| 2006/0187118 A1 | 8/2006 | Kimata | |

FOREIGN PATENT DOCUMENTS

CN  471194 A  1/2004

* cited by examiner

*Primary Examiner* — Thomas H Tarcza
*Assistant Examiner* — Fred H Mull
(74) *Attorney, Agent, or Firm* — Fulbright & Jaworski L.L.P.

(57) ABSTRACT

An antenna system comprising a first antenna element, a second antenna element, and a parasitic element, wherein the parasitic element is arranged with regard to the first antenna element and the second antenna element such that a greatest difference in gain between respective antenna patterns of the first and second antenna elements occurs at a null of the pattern of the first antenna element.

21 Claims, 6 Drawing Sheets

FIG. 1

| Antenna 102 | Antenna 103 |
|---|---|
| Frequency = 2.4 GHz | Frequency = 2.4 GHz |
| Main lobe magnitude = 0.3 dB | Main lobe magnitude = 0.2 dB |
| Main lobe direction = 320.0 deg. | Main lobe direction = 240.0 deg. |
| Angular width (3 dB) = 162.5 deg. | Angular width (3 dB) = 99.5 deg. |
| | Side lobe level = -3.5 dB |

DIRECTION FINDING ANTENNA SYSTEMS AND METHODS FOR USE THEREOF

TECHNICAL FIELD

The present disclosure is directed to direction finding antenna systems and, more specifically, to direction finding antenna systems employing a plurality of antennas.

BACKGROUND OF THE INVENTION

Antenna systems come in a variety of forms. Of particular popularity now are systems built on Printed Circuit Boards (PCBs). For example, a PCB patch antenna includes a radiating portion that is disposed on a layer of a PCB and a ground plane that is disposed on another layer either above or below the radiating portion (where "above" and "below" refer to positions in the stack of layers). Since the radiating portion of a patch antenna utilizes the ground plane, it is called a grounded antenna. Other antenna elements are not oriented above or below a ground plane and are referred to as ungrounded antennas. A Planar Inverted F Antenna (PIFA) can be made from some patch antennas by shorting an end of a patch element to ground. Many antenna elements are associated with parasitic elements to change a pattern and/or add frequency bands to the antenna's operational spectrum.

One example of a use of an antenna system is IN a direction finding (or beacon finding) antenna system. A current use of direction finding antenna systems includes finding sources of Radio Frequency (RF) interference (sometimes called "electromagnetic interference" or "EMI") or finding beacons.

The prior art includes some designs for indicating a direction of a Radio Frequency (RF) beacon. Prior art direction-finding antennas use one of two technologies. The first technology is a highly directive antenna beam, such as that produced by a Yagi antenna or a phased array. A highly directive antenna beam can sometimes give a good indication about the direction of an RF beacon. Generally, when the beam is swept across all azimuthal directions, the direction with the greatest signal strength is a likely candidate for the direction of the beacon. Highly directive antenna systems, however, are often large and unwieldy, thereby causing them to be unfit for portable or casual use.

The other technology that is employed in current direction finding antenna systems includes calculating a signal strength difference in two antenna beams. One antenna beam is substantially uniform in all azimuthal directions, whereas the other antenna beam includes a plurality of nulls. An example prior art system includes a dipole and a slot antenna placed on a PCB. When a beacon is along an azimuth with a null, the signal strength difference between the uniform beam and the beam with the null is large, thereby giving an indication of direction. However, multiple nulls means that there is more than one azimuthal direction that shows a large signal strength difference. In the case of dipole/slot systems, the nulls are 180 degrees apart, so that a large signal strength difference either means a user is directed in the right direction or exactly in the wrong direction. Currently there is no direction finding antenna system on the market that is compact and provides for unequivocal indications of azimuthal direction of a transmitter.

BRIEF SUMMARY OF THE INVENTION

Various embodiments of the present invention are directed to a systems and methods which include at least two antenna elements providing a first and second antenna patterns, the antenna elements configured such that the greatest difference in received signal strength of the two antenna patterns occurs at a null of one of the antenna patterns.

In one example, a system includes an antenna A and an antenna B. A third element is configures to act as a parasitic element for antenna A and as a reflector for antenna B. Antennas A and B and the third element are arranged so that antenna B has a substantially omni-directional pattern, whereas antenna A has a cardioid pattern with one null. An RF circuit receives signals from the antennas and compares the signal strengths. The azimuthal direction that shows the greatest difference signal strength can also be considered the direction of a signal.

The antenna elements can be any of a variety of antennas, such as PIFAs, patches, monopoles, helixes, horns and the like. The antenna elements (including the third element) can be grounded or ungrounded, shorted to ground or floating.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
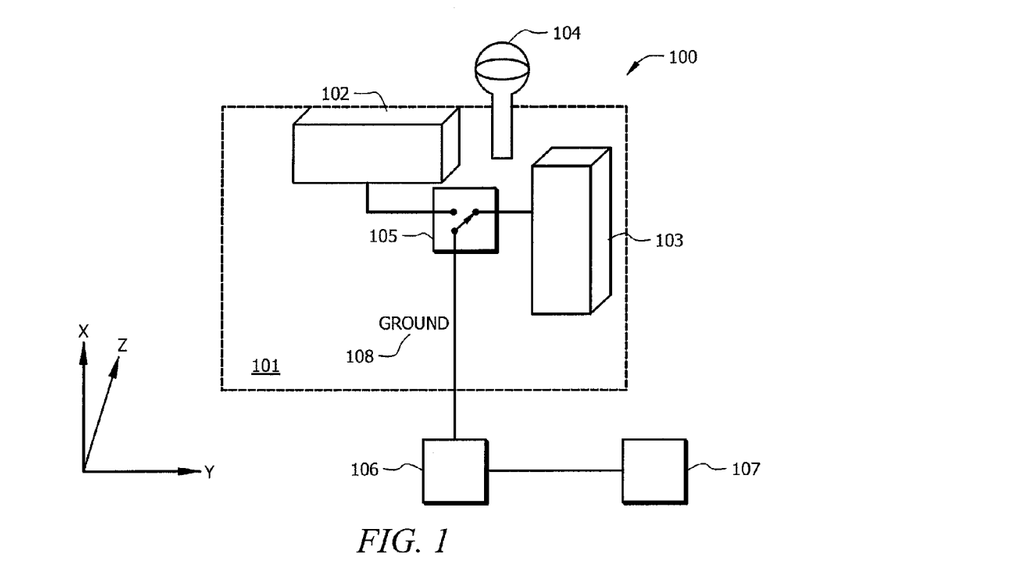
FIG. 1 is an illustration of an exemplary antenna system adapted according to one embodiment of the invention.

FIG. 1 is an illustration of exemplary antenna system 100 adapted according to one embodiment of the invention. Antenna system 100 includes two antenna elements 102 and 103. Between antenna elements 102 and 103 is parasitic element 104, and also there is switch 105 that is used to select signals from one antenna element 102/103 at a time. In this particular example, the various components are disposed on PCB 101, which also hosts ground plane 108 on a lower layer, the outline of which is indicated by a dashed line. Parasitic element 104 is disposed so as to provide an RF trap on antenna 103, thereby creating a single null on the direction of a line between the parasitic element and antenna 103.

System 100 also includes RF module 106 in communication with switch 105 to receive the signals from antennas 102 and 103. In this embodiment, RF module 106 has a control circuit operating switch 105 to switch between receiving the signals of antenna 102 and antenna 103. Switch 105 alternatingly feeds signals from antennas 102 and 103 to RF module 106. RF module 106 is in communication with computing circuit 107, which compares the strengths of the respective signals from antennas 102 and 103. Computing circuit 107 outputs an indication of direction (derived from comparing signal strengths) to, e.g., a user interface (not shown). In some embodiments RF module 106 includes a Received Signal Strength Indicator (RSSI). Antenna elements 102 and 103 are shown above the ground plane; therefore, antenna system 100 is a grounded antenna system. Other embodiments may move any one or more of antenna elements 102 and 103 (and also parasitic element 104) away from the ground plane, thereby making an ungrounded antenna system.

Figure 2:
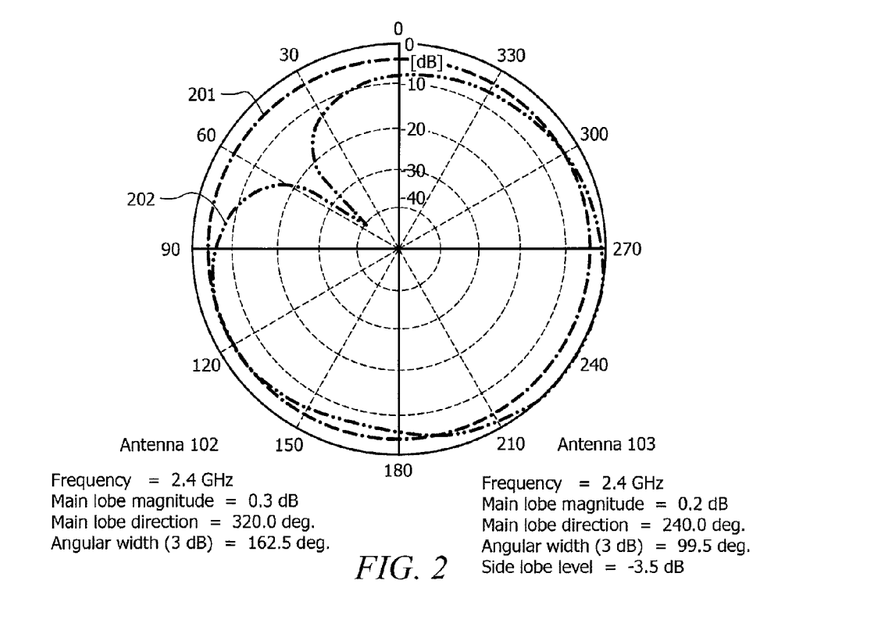
FIG. 2 is an illustration of exemplary antenna patterns associated with the respective antennas of FIG. 1.

FIG. 2 is an illustration of exemplary antenna patterns 201 and 202 associated with antennas 102 and 103 (of FIG. 1), respectively. As can be seen, pattern 202 includes a null between thirty and sixty degrees, while pattern 201 is substantially uniform in all azimuthal directions. When an RF signal is received in the azimuthal direction of the null, the difference between the signal strengths of antennas 102 and 103 is greatest. In this particular example, the difference is over thirty decibels. A computing circuit, such as circuit 107 of FIG. 1, compares the signal strengths and outputs an indication of the comparison.

Figure 3:
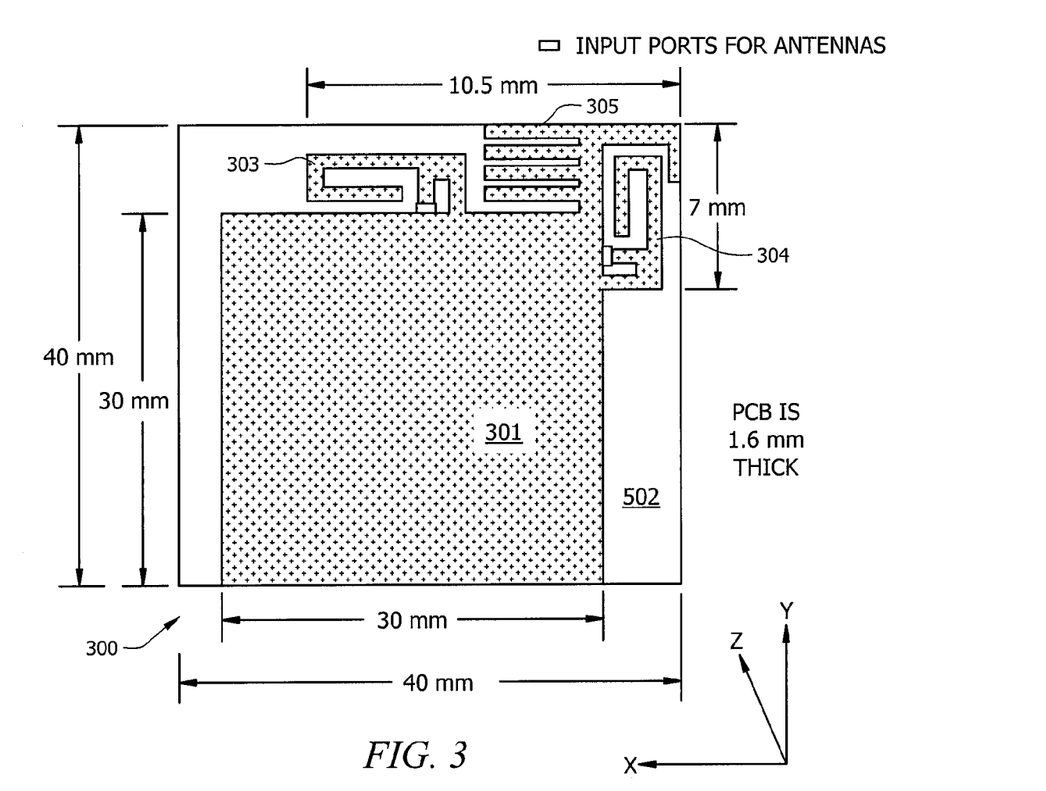
FIG. 3 is an illustration of an exemplary antenna system, adapted according to one embodiment of the invention.

FIG. 3 is an illustration of exemplary antenna system 300, adapted according to one embodiment of the invention. Antenna system 300 includes ground plane 301, antenna elements 303 and 304, as well as parasitic element 305 disposed on Printed Circuit Board (PCB) 302. In this example, the conductive portions are made of copper; however, other conductors can be used. Substrates other than PCBs can be used as well.

Parasitic element 305 is parasitic with respect to antenna element 304 and acts as a reflector with respect to antenna element 303. Antenna elements 303 and 304 and parasitic element 305 are configured such that the greatest signal strength difference between antenna elements 303 and 304 occurs at an azimuthal direction corresponding to a null of antenna element 304. While not shown in FIG. 3, some embodiments of system 300 also include an RF module such that the RF module receives signals alternatingly from antenna elements 303 and 304. Suitable switches include those made from pin diodes, transistors, integrated circuits, manual switches, and the like. Various embodiments provide a signal from each antenna to the RF circuit at least once each time the user orients the direction-finding device to a direction. Some embodiments provide for periodic switching, such as at five Hertz, ten Hertz, or the like. Other embodiments of the invention may omit the switch and instead provide for two RF inputs to the RF module.

FIG. 3 includes dimensions and is drawn to scale. System 300 is operable in the band from 2.4 GHz to 2.48 GHz. While the dimensions of system 300 are given, it should be noted that not all embodiments of the invention are so limited. For instance, antenna systems can typically be scaled to work at different operating bands, and the same is true for system 300 (as well as for system 100 of FIG. 1). In fact, embodiments of the invention can be created for any RF band.

Furthermore, the shapes of antenna elements, ground planes, and parasitic elements can differ from that shown in FIGS. 1 and 3. For instance, antenna elements and parasitic elements can be chosen from a variety of forms, such as monopoles, helixes, PIFAs, loops, horns, and the like. Any or all of the elements can be grounded or ungrounded, shorted to ground or not shorted to ground (i.e., floating).

Figure 4:
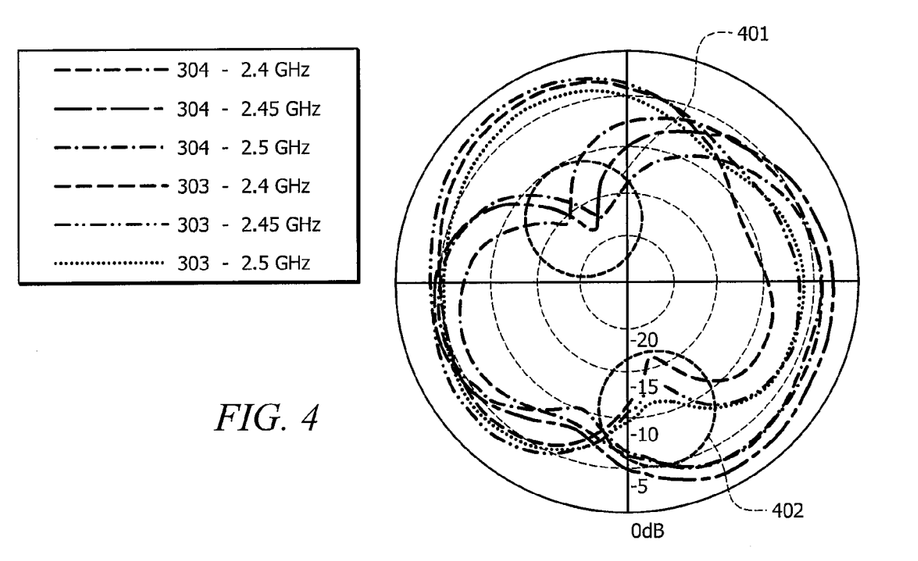
FIG. 4 is an illustration of antenna patterns for the antenna elements of FIG. 3 at various points in the operating band.

FIG. 4 is an illustration of antenna patterns for antenna elements 303 and 304 of FIG. 3 at various points in the operating band. The greatest difference between the signal strengths is at the azimuth that includes null 401 of antenna element 304 (i.e., about 0 dB from antenna 303 compared to about −15 dB from antenna 304 at the azimuth of null 401). Antenna element 303 also has null 402, but the difference between the signal strengths at that azimuth is less than at the azimuth of null 401 (i.e., less than the 15 dB difference at null 401). For instance, the value of the difference at null 401 is around +15 dB (i.e. 0−(−15))=+15 dB), whereas the value of the difference at null 402 is −15 dB (i.e. −15 dB−0 dB=−15 dB). The value of the difference at null 401 is much greater than the value of the difference at null 402. (i.e. +15 dB is greater than −15 dB).

Figure 5:
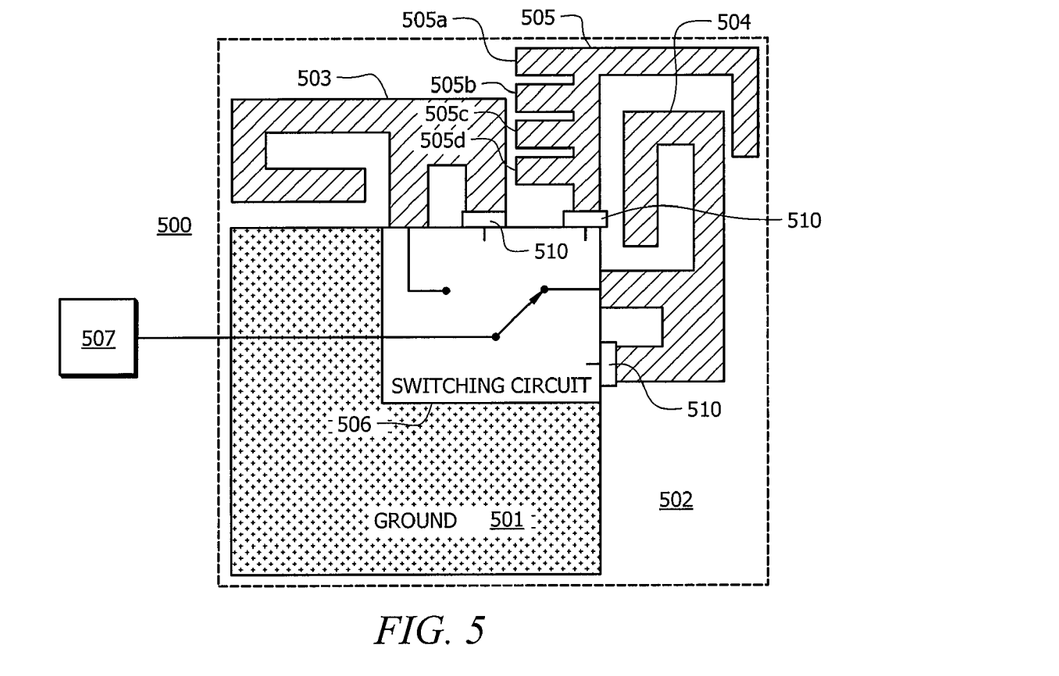
FIG. 5 is an illustration of an exemplary antenna system adapted according to one embodiment of the invention.

FIG. 5 is an illustration of exemplary antenna system 500 adapted according to one embodiment of the invention. Antenna system 500 is somewhat similar in structure to system 300 of FIG. 3, but is not to scale and is more generalized for illustrative purposes. System 500 includes ground plane 501 disposed on substrate 502. System 500 also includes PIFA antenna elements 503 and 504, as well as parasitic element 505.

Switch 506 operates to supply the signals from antenna elements 503 and 504 alternatingly to module 507 that receives the signals and compares signal strengths. As with any of the embodiments shown herein the design may omit switch 506 and use a two-input RF module instead. Blocks 510 are conceptual and illustrate that any one or more of elements 503-505 can be shorted to ground or floating.

The operating frequency of system 500 can be changed by modifying the effective radiating lengths of elements 503 and 504. The azimuthal direction of the null of antenna element 505 can be tuned by modifying the saw tooth structure of parasitic element 505. Generally, the lengths of protrusions 505a-d affect the direction of the null, such that the lengths of protrusions 505a-d can be designed to give a desired null direction.

Antenna element 503 sees element 505 not as a parasitic element, but as a reflector. In this example, antenna element 503 and element 505 are configured within system 500 so that the electric field on antenna element 503 is highest at points furthest from element 505.

Figure 6:
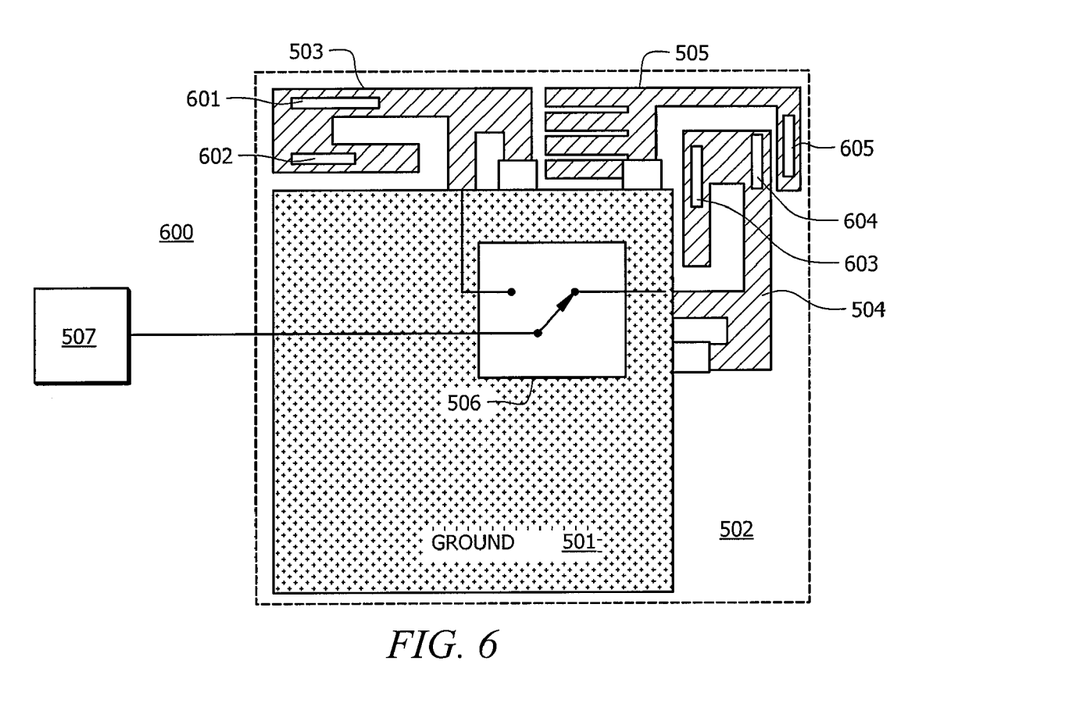
FIG. 6 is an illustration of an exemplary antenna system adapted according to one embodiment of the invention.

FIG. 6 is an illustration of exemplary system 600 adapted according to one embodiment of the invention. System 600 is similar to system 500 of FIG. 5, with the addition of slots 601-605. Slots 601-605 are used in this example to provide matching between switching circuit 506 and antenna elements 503 and 504. Slots 601-605 also fine tune the operating band of system 600.

Figure 7:
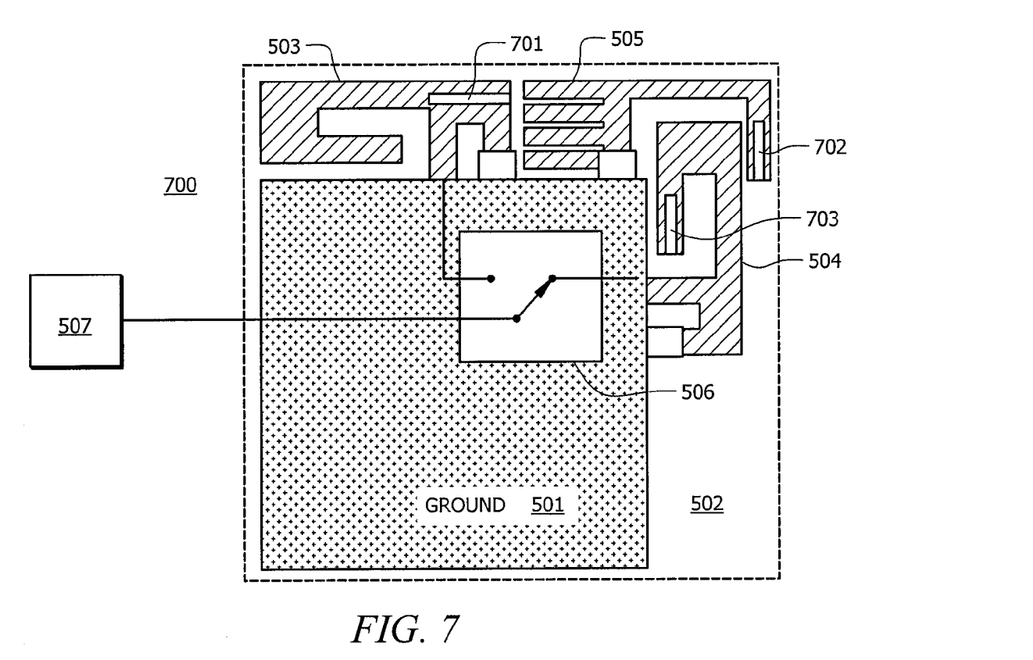
FIG. 7 is an illustration of an exemplary antenna system adapted according to one embodiment of the invention.

FIG. 7 is an illustration of exemplary system 700 adapted according to one embodiment of the invention. System 700 is similar to system 500 of FIG. 5 with the addition of notches 701-703. Notches 701-703 are used in system 700 to suppress mutual coupling between elements 503 and 504 and to shape the patterns of antenna elements 503 and 504. Other embodiments use notches to create additional operating bands and/or fine tune operating bands.

Figure 8:
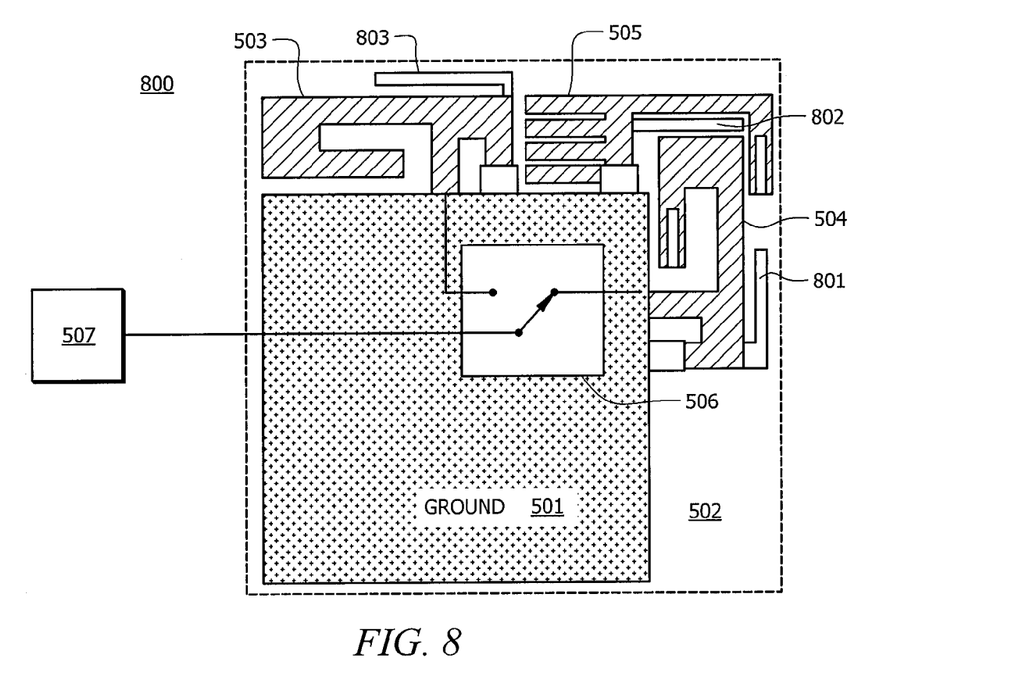
FIG. 8 is an illustration of an exemplary antenna system adapted according to one embodiment of the invention.

FIG. 8 is an illustration of exemplary system 800 adapted according to one embodiment of the invention. System 800 adds strips 801-803. In this example, additional strips 801-803 are used for pattern shaping and impedance matching. In other embodiments, additional strips add operating bands to antenna systems.

Figure 9:
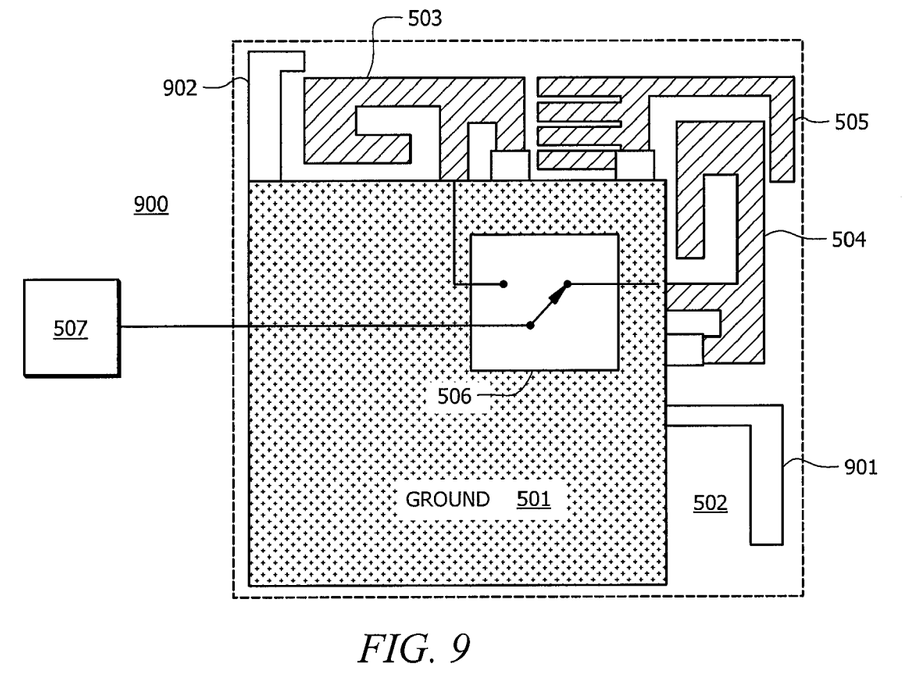
FIG. 9 is an illustration of an exemplary antenna system adapted according to one embodiment of the invention.

FIG. 9 is an illustration of exemplary system 900 adapted according to one embodiment of the invention. System 900 employs additional parasitic elements 901 and 902. Parasitic elements 901 and 902 provide pattern shaping, impedance matching, and/or additional operating bands. Parasitic elements 901 and 902 are shown shorted to ground, but in other embodiments can be floating.

Figure 10:
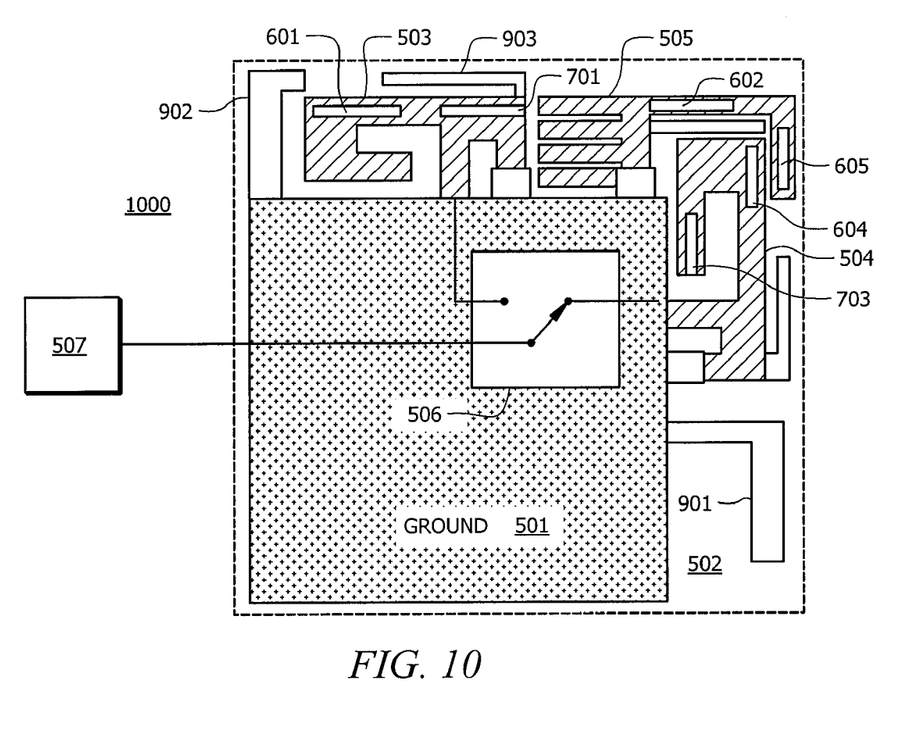
FIG. 10 is an illustration of an exemplary antenna system adapted according to one embodiment of the invention.

FIG. 10 is an illustration of exemplary system 1000 adapted according to one embodiment of the invention. System 1000 illustrates that a given embodiment can incorporate one or more of slots, notches, additional strips, and additional parasitic elements.

Figure 11:
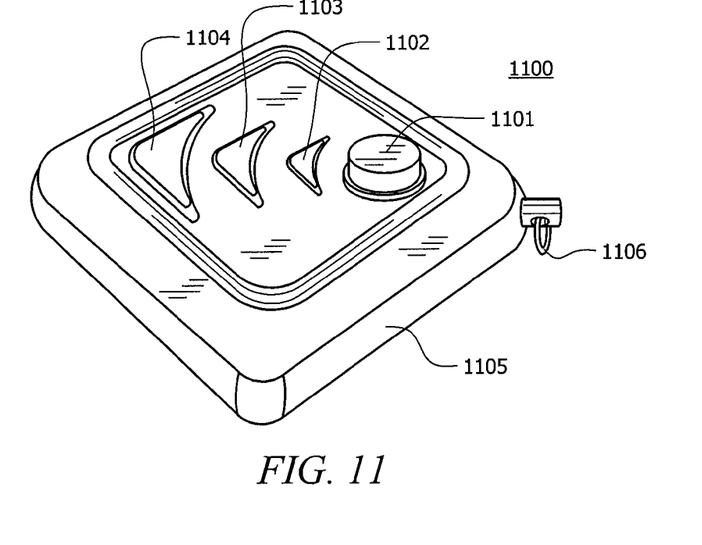
FIG. 11 is an illustration of an exemplary antenna system adapted according to one embodiment of the invention.

FIG. 11 is an illustration of exemplary system 1100 adapted according to one embodiment of the invention. System 1100 is an example consumer device that employs one or more antenna systems, such as the systems described above with respect to FIGS. 1-10. In this example, system 1100 is small enough for a consumer to carry in a pocket and/or attach to a keychain.

System 1100 includes housing 1105, which conceals and protects the antenna system (not shown), and which hosts keychain attaching mechanism 106. Activation button 1101 turns system 1100 on and begins the process of receiving signals and comparing signal strengths. As the difference in receive signal strength increases, lights 1102-1104 are successively illuminated. When all three lights 1102-1104 are illuminated, a human user has a reliable indication of direction to a beacon (not shown).

Figure 12:
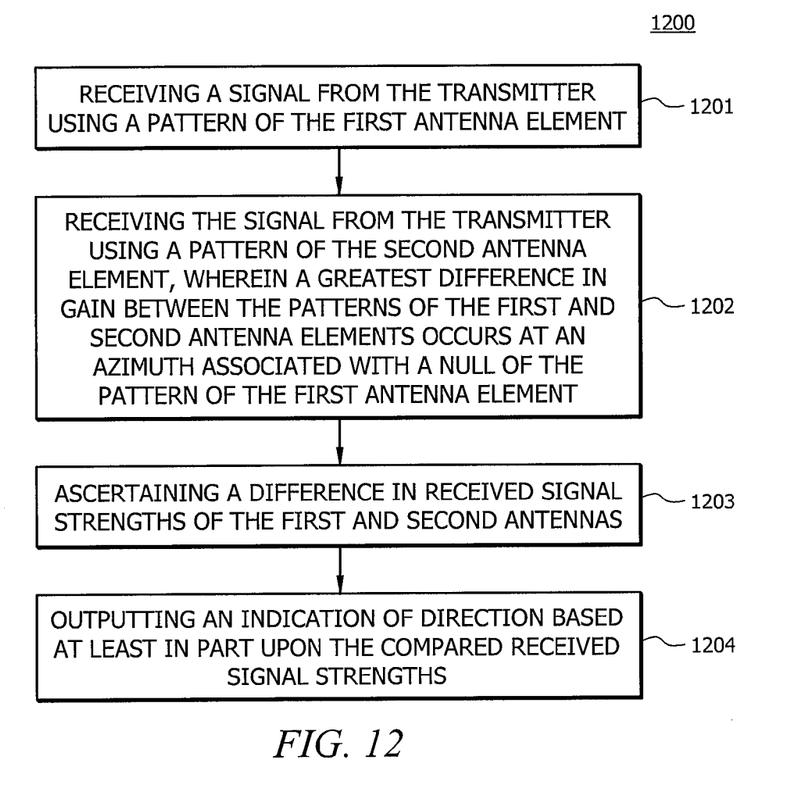
FIG. 12 is an illustration of an exemplary method adapted according to one embodiment of the invention.

FIG. 12 is an illustration of exemplary method 1200 adapted according to one embodiment of the invention. Method 1200 may be performed, for example, by a device employing one or more of the systems described above.

In step 1201, a signal is received from a transmitter using a pattern of the first antenna element. In step 1202, a signal is received from the transmitter using a pattern of the second antenna element. In this embodiment, the greatest difference in gain between the patterns of the first and second antenna elements occurs at an azimuth of a null of the first antenna element's pattern. The difference in gain is a known value, as is the azimuth angle of the null of the first antenna.

In step 1203, a difference in received signal strengths of the first and second antennas is ascertained. For example, an RSSI can be used to ascertain the signal strengths. When the difference in the received signal strengths of the two antenna patterns corresponds to the known greatest gain difference, the transmitter is at the same azimuth angle as the null of the first antenna pattern.

In step 1204, an indication of direction is output and is based, at least in part, upon the compared received signal strengths. For example, an analog signal that is proportional to the difference in received signal strengths can be output to computing circuitry that logically calculates how close the direction is to the azimuth of the null. Indications of direction can be fed to a User Interface (UI). For instance, a user interface (such as lights 1102-1104 of FIG. 11) can indicate whether the direction is close (and/or getting closer) or far (and/or getting farther) from the azimuth of the transmitter. In the consumer device shown as system 1100 in FIG. 11, a signal strength difference corresponding to the azimuth angle with the greatest gain difference causes all three lights to light up. Lesser gain differences cause fewer than all lights to light up. A user can turn around, holding the device, and watch as lights 1102-1104 are illuminated successively. When the user sees all three lights 1102-1104 illuminated, the user knows he is looking in the direction of the transmitter.

While method 1200 is shown as a series of discrete steps, the scope of embodiments is not so limited, as steps may be added, omitted, rearranged, or modified. For instance, in some examples, steps 1201 and 1202 are performed at the same time. In other embodiment, such as those that switch between the inputs of the antennas, steps 1201 and 1202 are repeated alternatingly.

Systems and methods, such as those described above with respect to FIGS. 1-12 can be put to a variety of uses. For example, beacons can be placed on children or pets, allowing a parent or pet owner to more quickly locate the child or pet when visual contact is lost. In another example, a beacon can be placed in a car so that the car's owner can locate the car in a crowded or large parking area. Various embodiments can also be used to locate EMI sources and jammers.

Various embodiments of the invention provide one or more advantages over prior art systems. For example, embodiments that include patterns with one null provide more certain indications than do systems that employ patterns with two or more nulls. Furthermore, embodiments of the invention can be made to be more compact than more highly-directive systems that employ, e.g., Yagi antennas or phased arrays.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An antenna system comprising:
   a first antenna element;
   a second antenna element; and
   a parasitic element, wherein the parasitic element is arranged with regard to the first antenna element and said second antenna element such that a greatest difference in gain between respective antenna patterns of said first and second antenna elements occurs at a null of the pattern of the first antenna element, said greatest difference being a known value, and wherein an indication of direction is determined based on a relationship between signal strengths received from the respective patterns and said known value.

2. The antenna system of claim 1 wherein the antenna pattern of said first antenna element comprises a cardioid.

3. The antenna system of claim 1 wherein the antenna pattern of said first antenna element comprises a single null.

4. The antenna system of claim 1 wherein the antenna pattern of said second antenna element is substantially omni directional.

5. The antenna system of claim 4 wherein the antenna pattern of said second antenna element has an overall difference in gain across all azimuth angles of less than 5 dB.

6. The antenna system of claim 1 wherein said first and second antenna elements are selected from the list consisting of:
   horn elements;
   helix elements;
   monopole elements;
   patch elements; and
   PIFA elements.

7. The antenna system of claim 1 wherein one or both of said first and second elements comprises components selected from the list consisting of:
   a slot;
   a notch; and
   an additional strip.

8. The antenna system of claim 1 further comprising at least one additional parasitic component.

9. The antenna system of claim 1 further comprising:
   circuitry receiving signals using said respective antenna patterns, comparing said signal strengths of the respective patterns, and providing an output indicating an amount of difference in said signal strengths, wherein said relationship is based on a comparison of said amount of difference and said known amount.

10. The antenna system of claim 9 further comprising:
    a user interface in communication with said circuitry receiving signals and providing said indication of direction.

11. A direction-finding antenna system comprising:
    a first antenna element;
    a second antenna element;
    a parasitic component, wherein said parasitic component and said first and second antenna elements are configured such that said first antenna element has a pattern with a single null, and said second antenna element has a pattern that is substantially omni directional across all azimuths; and
    circuitry receiving signals from each of said antenna patterns, comparing signal strengths thereof, and providing an indication of direction of a signal transmitter based at least in part on the comparing.

12. The direction-finding antenna system of claim 11 further comprising:
    a user interface in communication with said circuitry receiving signals and operable to provide said indication of direction.

13. The direction-finding antenna system of claim 11, wherein said direction-finding antenna system is included in a handheld device.

14. The direction-finding antenna system of claim 11 wherein said pattern of said second antenna element includes a single null.

15. The direction-finding antenna system of claim 11 wherein said pattern of said second antenna element includes a single null that has more gain than a null of said pattern of said first antenna element.

16. The direction-finding antenna system of claim 11 further comprising:
    a switch in communication with said first and second antenna elements and with said circuitry receiving signals, said switch alternatingly providing signals from said first and second antenna elements to said circuitry receiving signals.

17. A method for providing an indication of direction of a transmitter using an antenna system that includes a first and a second antenna element and a parasitic element, the method comprising:
    receiving a signal from the transmitter using a pattern of the first antenna element;
    receiving the signal from the transmitter using a pattern of the second antenna element, wherein a greatest difference in gain between the patterns of the first and second antenna elements occurs at an azimuth associated with a null of the pattern of the first antenna element, said greatest different being a known value;
    ascertaining a difference in received signal strengths of the first and second antennas;
    comparing said ascertained difference to said known value; and
    outputting an indication of direction based at least in part upon said difference in received signal strengths.

18. The method of claim 17 wherein an ascertained value substantially corresponding to said known value indicates an azimuthal direction of said transmitter.

19. The method of claim 17 wherein receiving the signal from the transmitter using the pattern of the second antenna element comprises:
    switching an input of an RF circuit to be electrically coupled to said second antenna element.

20. The method of claim 17 wherein receiving the signal from the transmitter using the pattern of the first antenna element comprises:
    switching an input of an RF circuit to be electrically coupled to said first antenna element.

21. The method of claim 17 further comprising:
    providing said indication of direction on a user interface.

* * * * *